US 007536401B2

(12) United States Patent
Bitonti et al.

(10) Patent No.: US 7,536,401 B2
(45) Date of Patent: May 19, 2009

(54) METHODS, SYSTEMS, AND COMPUTER PROGRAM PRODUCTS FOR USING GRAPHS TO SOLVE CIRCULAR DEPENDENCY IN OBJECT PERSISTENCE

(75) Inventors: Thomas F. Bitonti, Cary, NC (US); Yang Lei, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 11/462,727

(22) Filed: Aug. 7, 2006

(65) Prior Publication Data

US 2008/0040367 A1    Feb. 14, 2008

(51) Int. Cl.
*G06F 12/00* (2006.01)

(52) U.S. Cl. .................. 707/101; 707/102; 707/103 R; 711/112

(58) Field of Classification Search ........................ None
See application file for complete search history.

(56) References Cited

U.S. PATENT DOCUMENTS

| 6,026,413 | A | 2/2000 | Challenger et al. | |
|---|---|---|---|---|
| 6,067,641 | A | 5/2000 | McInerney et al. | |
| 6,339,777 | B1 * | 1/2002 | Attaluri et al. | 707/103 R |
| 6,651,047 | B1 * | 11/2003 | Weschler, Jr. | 707/1 |
| 2005/0060647 | A1 * | 3/2005 | Doan et al. | 715/514 |
| 2005/0149555 | A1 * | 7/2005 | Wang et al. | 707/103 R |
| 2007/0250492 | A1 * | 10/2007 | Angel et al. | 707/4 |

FOREIGN PATENT DOCUMENTS

JP    2005025445 A    1/2005

OTHER PUBLICATIONS

T. Catarci, et al., Graphical interaction with heterogeneous databases; The VLDB Journal (1997) 6; pp. 97-120.
Victor M. Markowitz, et al., Representing Extended Entity-Relationship Structures in Relational Databases: A Modular Approach; ACM Transactions on Database Systems, vol. 17, No. 3, Sep. 1992, pp. 423-464.

* cited by examiner

*Primary Examiner*—Hosain T Alam
*Assistant Examiner*—Azam Cheema
(74) *Attorney, Agent, or Firm*—Cantor Colburn LLP; Bruce Clay

(57) ABSTRACT

A method, system, and computer program product for reducing dependency calculation time in object persistence with circular referential integrity dependency is provided. The method includes building a graph using foreign key dependency from object to relational mapping, where nodes of the graph are object types and connected directionally from a source containing a foreign key to a target of a foreign key reference. The method further includes topologically sorting the graph to order dependencies among the nodes including circular dependences. The method also includes encapsulating the circular dependencies as a complex node. Furthermore, the method includes performing object dependency calculations on the nodes and the complex node in the graph. The results of the object dependency calculations are used to generate a sequence in which the objects can be modified in a relational database.

3 Claims, 3 Drawing Sheets

Encapsulated Cluster of Nodes
(Complex Node) with
Circular Dependency

METHODS, SYSTEMS, AND COMPUTER PROGRAM PRODUCTS FOR USING GRAPHS TO SOLVE CIRCULAR DEPENDENCY IN OBJECT PERSISTENCE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to circular dependency in object persistence, and particularly to methods, systems, and computer program products for using graphs to solve circular dependency in object persistence.

2. Description of Background

Before our invention, modifying object persistence data stored in a relational database required a complex sequence to determine the proper order of operations to modify dependent objects when circular dependency existed within the relational stricture. This problem is due to the different methods used to maintain referential integrity in object schemas versus database schemas. Referential integrity refers to the concept that if one entity references another, then the referenced entity actually exists. Object schemas define the relationships between objects created using object-oriented programming languages such as Java™, commonly used to develop enterprise applications. Object type, also referred to as a class, defines the characteristics of each object, which may include attributes and methods or function calls that act upon the object or trigger events. Object types often contain dependency relationships to other object types. Objects are typically dynamic instantiations of object types and collectively form an object schema. For objects to be-persistent, that is stored for future use, objects must be mapped from an object schema to a database schema.

A database schema defines the relationships between tables of records organized within a database. Referential integrity of a relational database is typically managed by maintaining a foreign key within a table that corresponds to the primary key of a second table, upon which the first depends. The term "primary key" is used interchangeably with "foreign key reference", as this is the field to which the foreign key refers. The dependency relationship between the records in each table may be one-to-one, one-to-many, many-to-one, or many-to-many. This relationship between primary and foreign keys can be extended to multiple levels and may include circular dependencies.

When modifying a relational database, the proper order of operations must be adhered to for insertion, deletion, and updates to maintain the referential integrity between the records in each table. For insertion operations, a parent record containing a primary key must be created prior to a child record containing a foreign key. Deletion operations require the reverse sequence.

When mapping objects from an object schema to a database schema, the objects' relationships to each other are maintained in a relational database using foreign key constraints. If object relationships contain circular dependencies, the tasks of determining the proper sequence of operations and maintaining the relationships upon modification can be quite complex and thus time consuming. What is needed, therefore, is a method to determine the dependency of objects and obtain a minimal dependent object sequence for each object type to reduce the calculation time when circular dependencies exist in persistent objects.

SUMMARY OF THE INVENTION

The shortcomings of the prior art are overcome and additional advantages are provided through the provision of methods, systems, and computer program products for reducing dependency calculation time in object persistence with circular referential integrity dependency. The method includes building a graph using foreign key dependency from object to relational mapping, where nodes of the graph are object types and connected directionally from a source containing a foreign key to a target of a foreign key reference. The method further comprises topologically sorting the graph to order dependencies among the nodes including circular dependencies. The method also includes encapsulating the circular dependencies as a complex node. Furthermore, the method comprises performing object dependency calculations on the nodes and the complex node in the graph. The results of the object dependency calculations are used to generate a sequence in which the objects can be modified in a relational database.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which minimizes the object level calculation time required when mapping persistent objects to a relational database containing circular dependencies.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
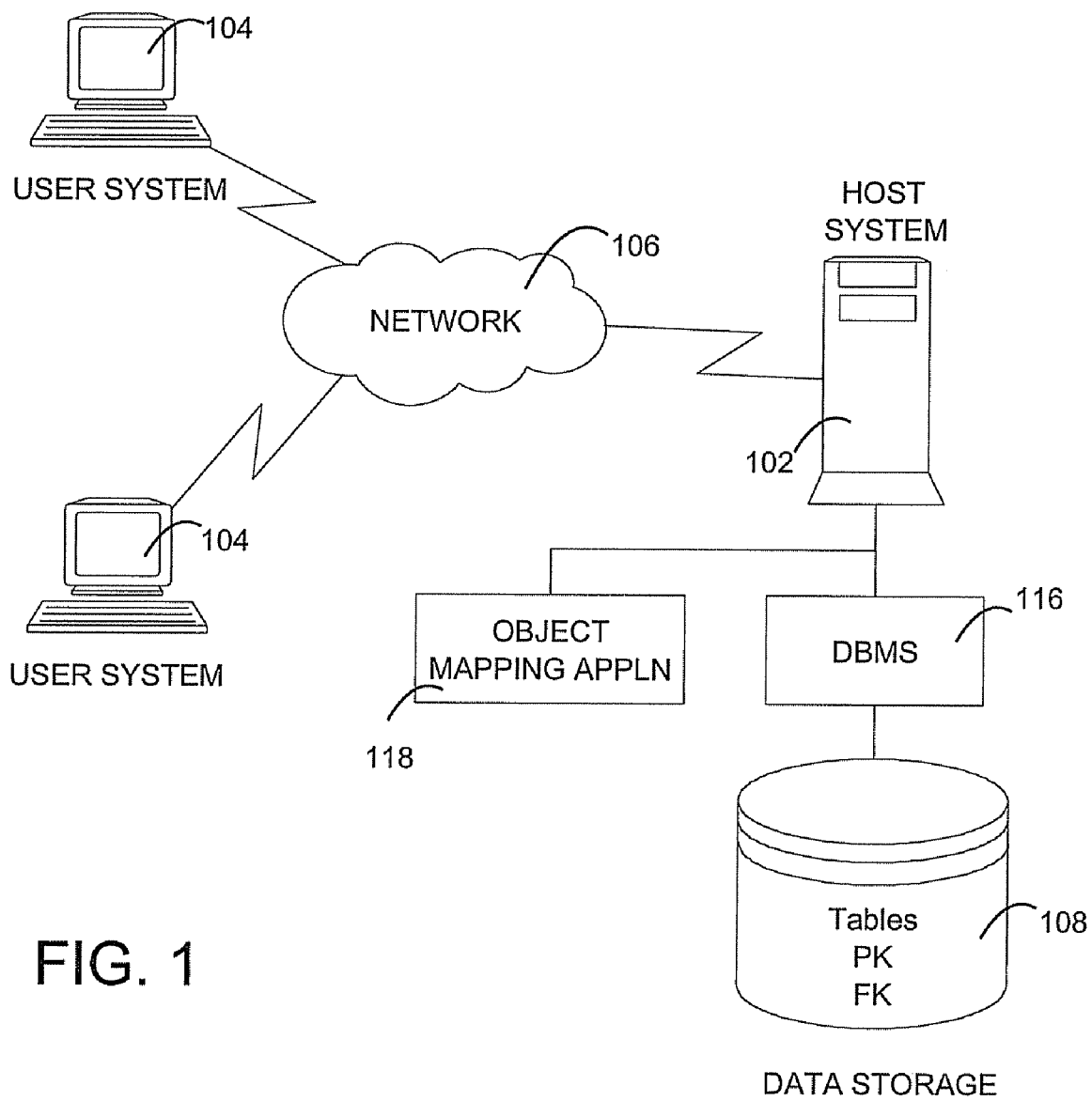
FIG. 1 illustrates one example of a block diagram of a system upon which mapping of persistent objects from an object schema to a database schema may be implemented in exemplary embodiments.

Turning now to the drawings in greater detail, it will be seen that in FIG. 1 there is a block diagram of a system upon which mapping of persistent objects from an object schema to a database schema can be implemented. Object schemas define the relationships between objects created using object-oriented programming languages such as Java™, commonly used to develop enterprise applications. A database schema defines the relationships between tables of records organized within a database. For objects to be persistent, that is stored for future use, objects must be mapped from an object schema to a database schema and written to a database.

The system 100 of FIG. 1 includes a host system 102 in communication with user systems 104 over a network 106. Host system 102 may be a high-speed processing device (e.g., a mainframe computer) that handles large volumes of processing requests from user systems 104. In exemplary embodiments, host system 102 functions as an applications server, web server, and database management server. User systems 104 may comprise desktop or general-purpose computer devices that generate data and processing requests, such as requests to utilize applications and perform searches. For example, user systems 104 may request web pages, documents, and files that are stored in various storage systems. While only a single host system 102 is shown in FIG. 1, it will be understood that multiple host systems may be implemented, each in communication with one another via direct coupling or via one or more networks. For example, multiple host systems may be interconnected through a distributed network architecture. The single host system 102 may also represent a cluster of hosts accessing a common data store, e.g., via a clustered file system which is backed by a data storage device 108.

Network 106 may be any type of communications network known in the art. For example, network 106 may be an interned, extranet, or an internetwork, such as the Internet, or a combination thereof. Network 106 may be a wireless or wireline network.

Data storage device 108 refers to any type of storage and may comprise a secondary storage element, e.g., hard disk drive, tape, or a storage subsystem that is external to host system 102. Types of data that may be stored in data storage device 108 include archive data that are infrequently accessed and databases. It will be understood that data storage device 108 shown in FIG. 1 is provided for purposes of simplification and ease of explanation and is not to be construed as limiting in scope. To the contrary, there may be multiple data storage devices utilized by the host system 102 in order to realize the advantages of the exemplary embodiments.

In exemplary embodiments, host system 102 executes various applications, including a database management system (DBMS) 116 and an object mapping application (OMA) 118. Other applications, e.g., business applications, a web server, etc., may also be implemented by host system 102 as dictated by the needs of the enterprise of the host system 102. DBMS 116 maintains one or more databases, controlling read and write accesses to data storage device 108 in which databases are stored. DBMS 116 maintains database relationships between tables of records, which may be related through directional dependencies as one-to-one, one-to-many, many-to-one, or many-to-many; a database with any combination of said relationships between tables is referred to herein as a relational database. The dependency relationships define how records within various database tables relate to each other. For example, in an e-commerce application, a single order may have multiple order line items; therefore, the relationship in a relational database schema between tables "OrderTable" and "OrderLineItemTable" would be one-to-many. Maintaining relationships between tables is referred to as referential integrity. Referential integrity of a relational database is typically managed by maintaining a foreign key (FK in data storage device 108) within a table that corresponds to a primary key (PK in data storage device 108) of a second table, upon which the first depends. The term "primary key" is used interchangeably with "foreign key reference", as this is the field to which the foreign key refers.

When user systems 104 access host system 102, objects may be created locally by each system. Alternatively, objects may exist exclusively within either user systems 104 or host system 102. Objects are instantiations of object types that encapsulate the data attributes and methods or function calls which act upon the object or trigger events. In exemplary embodiments, host system 102 creates objects residing within host system 102 in response to a request from user systems 104. Returning to the e-commerce example, user systems 104 may access host system 102 to place an order for goods or services. When host system 102 receives the request to place an order, host system 102 may dynamically create an Order object to manage and track the request. As multiple items are requested as part of the order, host system 102 may dynamically create OrderLineItem objects which are dependent upon the Order object. The relationship between Order and OrderLineItem objects is defined through an object schema as embodied in the object type definitions for each object. The Order and associated OrderLineItems must be made persistent, that is stored, prior to termination of the transaction. Persistent objects may be created through Enterprise JavaBeans™ or other such component architectures for distributed systems. DBMS 116 cannot directly store objects in a relational database in data storage device 108 due to the differences in formatting between an object schema and a relational database schema, often referred to in the art as an impedance mismatch.

OMA 118 may work in conjunction with DBMS 116 to manage mapping between persistent objects in host system 102 and a relational database in data storage device 108; although, it is understood that OMA 118 may be incorporated within DBMS 116 itself. When modifying a relational database, the proper sequence of operations must be adhered to for insertion, deletion, and updates to maintain the referential integrity between the records in each table. For insertion operations, a parent record containing a primary key (PK in data storage device 108) must be created prior to a child record containing a foreign key (FK in data storage device 108). Deletion operations require the reverse sequence. OMA 118 analyzes the type of each object within the object schema in host system 102 to determine the dependency relationships. OMA 118 builds an ordered graph of the dependencies and solves for circular dependencies to generate the proper sequence of operations to be performed by DBMS 116 while maintaining referential integrity. The details of this process are further defined herein.

Figure 2:
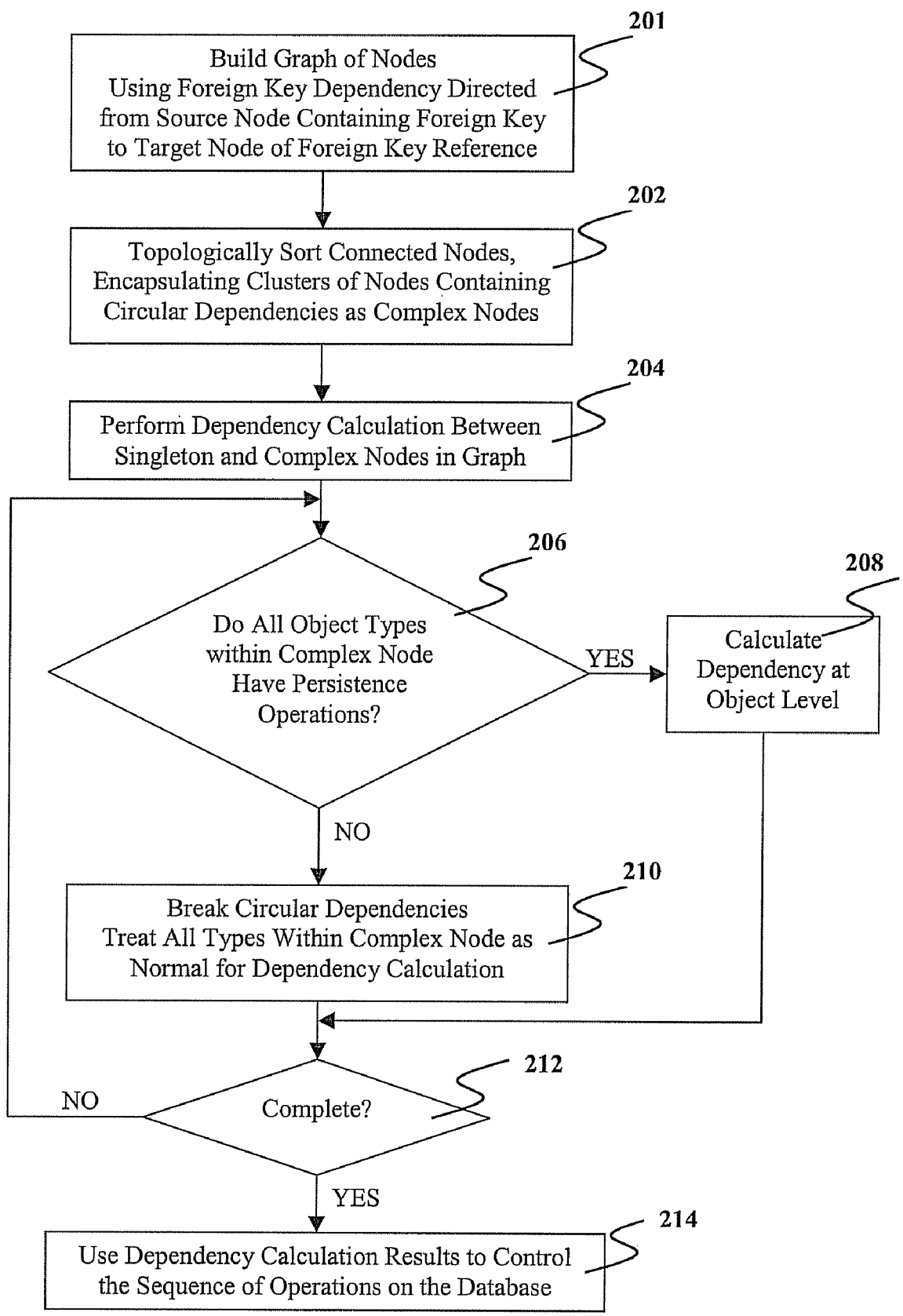
FIG. 2 illustrates one example of a flow diagram describing a process for using graphs to solve circular dependency in object persistence in exemplary embodiments.

Turning now to FIG. 2, a process for implementing OMA 118 using graphs to solve circular dependency in object persistence will now be described in accordance with exemplary embodiments. OMA 118 is initiated as part of the object mapping process in response to requesting entities, such as user systems 104. At step 201, OMA 118 uses foreign key dependency from a relational database, managed by DBMS 116, to build a graph of object type nodes. Each object type node is comprised of the various subtypes of the persistent object it represents and holds references to other object type nodes to which it relates. The subtypes within each object type node may or may not be persistent object types. An object type node may also contain object type nodes nested within it, referred to as a complex node. The graph at step 201 is comprised of object type nodes that are connected in the direction of dependency from the source node containing a foreign key to the target node of the foreign key reference. A source node is an object type node that is lower in the hierarchy of the database schema being mapped, while a target node is an object type node that is higher in the hierarchy. In one example, the source node may contain object type "OrderLineItemType" and the target node may contain object type "OrderType", such that resulting graph is OrderLineItemType–>OrderType; i.e. source node points to target node. In this example, object type OrderType maps to relational database table OrderTable, which holds a primary key; and object type OrderLineItemType maps to relational database table OrderLineItemTable, which holds a foreign key.

Figure 3:
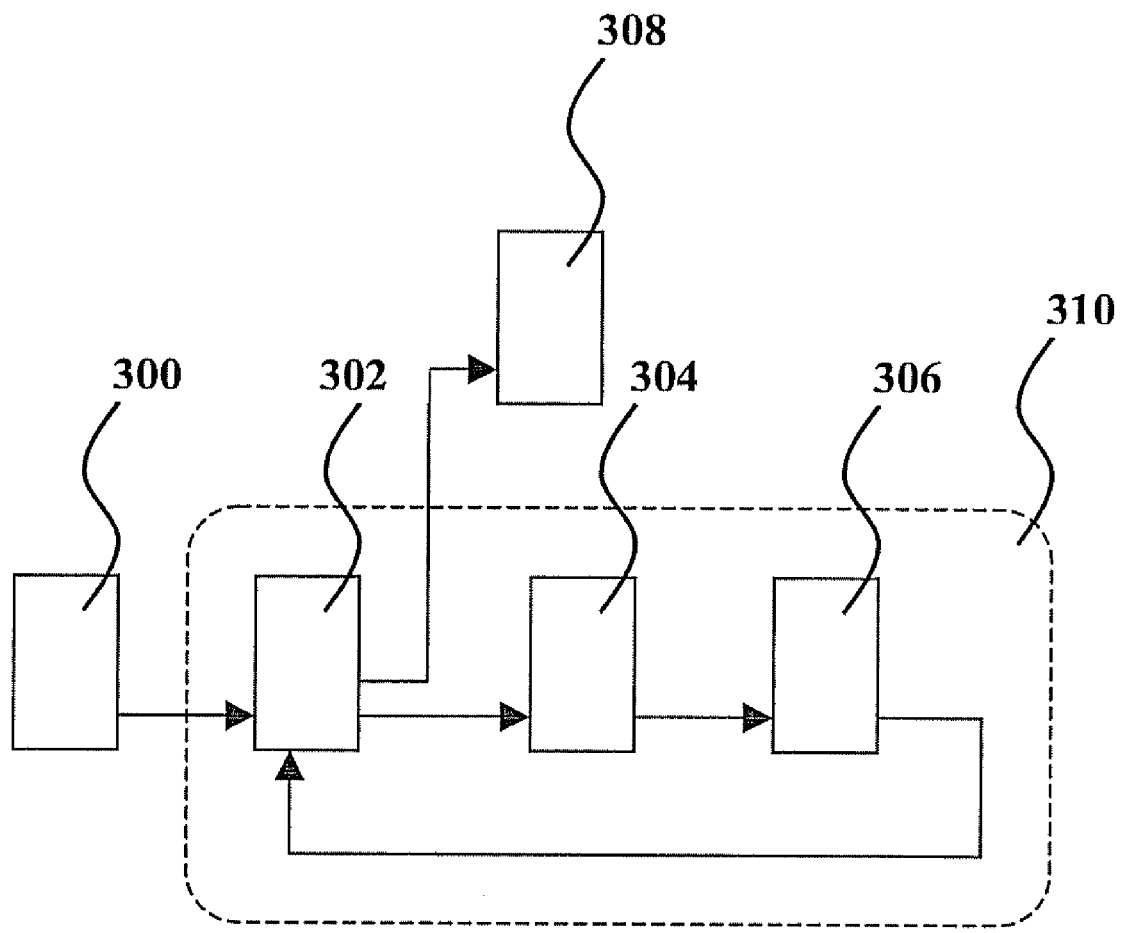
FIG. 3 illustrates one example of an ordered graph of dependent object types with encapsulated circular dependencies in exemplary embodiments.

At step 202, OMA 118 topologically sorts the connected graph nodes. FIG. 3 depicts one example of an ordered graph of nodes. In this exemplary embodiment, node 300 is directionally connected to node 302, node 302 is directionally connected to both nodes 304 and 308, node 304 is directionally connected to node 306, and node 306 is directionally connected to node 302. A directional connection is a "depends from" relationship; i.e. node 300 depends from node 302. At step 202, when circular dependencies exist within the graph (e.g., nodes 302, 304, and 306), the nodes within the circular relationship may be encapsulated as a complex node 310. A circular dependency is a relationship wherein two nodes are mutually dependent with or without intermediate node dependencies. It is understood that the graph depicted in FIG. 3 is only an example embodiment and many other possible object relationships and corresponding graphs could be used as determined by the object structure utilized to practice the invention, including nested relationships of complex nodes within complex nodes. In exemplary embodiments, the topological sort at step 202 may traverse the graph, reverse the direction of the connections between nodes, and collapse previously visited nodes until all circles are removed from the graph.

At step 204, OMA 118 performs an object dependency calculation on singleton and complex nodes to determine the order of operations in which the relational database, managed by DBMS 116, may be updated. Nodes that are not encapsulated as complex nodes 310, are referred to as "singleton" nodes (e.g., nodes 300 and 308). At a high level, all circular dependencies are removed and replaced by complex nodes, so a simple dependency calculation can be performed. Within each complex node, OMA 118 may perform a subset of dependency calculations.

At step 206, OMA 118 iterates through all complex nodes. The object type of each node encapsulated within the complex node may be analyzed for persistence operations such as create, update, and delete. At step 206, if OMA 118 does find persistence operations within all of the object types; then at step 208, OMA 118 may perform all dependency calculations at the object instance level. If no persistence operations are found within any of the object types; then at step 210, OMA 118 may break the circular dependency and all object types within the complex node may be treated as normal for the dependency calculation, provided that further complex nodes are not still nested within the complex node.

At step 212, OMA 118 repeats steps 206, 208, and 210 until all nodes have been analyzed, including all nested complex nodes.

At step 214, once all dependency calculations are complete, the results can be used to control the sequence of operations on the database. The operations may include inserting, deleting, or updating persistent objects stored within the database.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. The computer usable media provides computer-readable storage, such as a portable computer diskette, a hard disk, a random access memory (RAM), a read-only memory (ROM), an erasable programmable read-only memory (EPROM or Flash memory), a portable compact disc read-only memory (CDROM), an optical storage device, a digital versatile disc (DVD), or any magnetic storage device. An example of the computer usable media includes the data storage device 108 of FIG. 1.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for reducing dependency calculation time in object persistence with circular referential integrity dependency, comprising:

building a graph using foreign key dependency from object to relational mapping, where nodes of the graph are object types and connected directionally from a source containing a foreign key to a target of a foreign key reference;

topologically sorting the graph to order dependencies among the nodes including circular dependences, wherein topologically sorting the graph comprises:
traversing the graph;
reversing directional connections of the nodes; and
collapsing nodes previously visited via the traversing until all circular paths are removed from the graph;

encapsulating the circular dependencies as one or more complex nodes;

performing object dependency calculations on the nodes and the one or more complex nodes in the graph, wherein the object dependency calculations are performed in a hierarchical manner, comprising:

analyzing all object types within each of the one or more complex nodes for persistence operations;

calculating, using a computer, dependency at an object instance level when all object types within one of the one or more complex nodes have persistence operations;

breaking circular dependencies when any object types within the one or more complex nodes do not have persistence operations and calculating dependency on all nodes that do not contain a nested complex node; and repeating said analysis and calculations for all nested nodes; and using results of the object dependency calculations to generate a sequence to modify the objects that maintains referential integrity in a relational database.

2. A system for reducing dependency calculation time in object persistence with circular referential integrity dependency, comprising:

a host system comprising a high-speed processing device in communication with a data storage device;

an object mapping application executing on the host system, the object mapping application performing:

building a graph using foreign key dependency from object to relational mapping, where nodes of the graph are object types and connected directionally from a source containing a foreign key to a target of a foreign key reference;

topologically sorting the graph to order dependencies among the nodes including circular dependences, wherein topologically sorting the graph comprises:

traversing the graph;

reversing directional connections of the nodes; and collapsing nodes previously visited via the traversing until all circular paths are removed from the graph;

encapsulating the circular dependencies as one or more complex nodes;

performing object dependency calculations on the nodes and the one or more complex nodes in the graph, wherein the object dependency calculations are performed in a hierarchical manner, comprising:

analyzing all object types within each of the one or more complex nodes for persistence operations;

calculating dependency at an object instance level when all object types within one of the one or more complex nodes have persistence operations;

breaking circular dependencies when any object types within the one or more complex nodes do not have persistence operations and calculating dependency on all nodes that do not contain nested complex nodes; and repeating said analysis and calculations for all nested nodes; and using results of the object dependency calculations to generate a sequence to modify the objects that maintains referential integrity in a relational database.

3. A computer program product for reducing dependency calculation time in object persistence with circular referential integrity dependency, the computer program product comprising computer usable media containing computer readable program code for implementing a method, the method comprising:

building a graph using foreign key dependency from object to relational mapping, where nodes of the graph are object types and connected directionally from a source containing a foreign key to a target of a foreign key reference;

topologically sorting the graph to order dependencies among the nodes including circular dependences, wherein topologically sorting the graph comprises:

traversing the graph;

reversing directional connections of the nodes; and collapsing nodes previously visited via the traversing until all circular paths are removed from the graph;

encapsulating the circular dependencies as one or more complex nodes;

performing object dependency calculations on the nodes and the one or more complex nodes in the graph, wherein the object dependency calculations are performed in a hierarchical manner, comprising:

analyzing all object types within each of the one or more complex nodes for persistence operations;

calculating dependency at an object instance level when all object types within one of the one or more complex nodes have persistence operations;

breaking circular dependencies when any object types within the one or more complex nodes do not have persistence operations and calculating dependency on all nodes that do not contain a nested complex node; and repeating said analysis and calculations for all nested nodes; and using results of the object dependency calculations to generate a sequence to modify the objects that maintains referential integrity in a relational database.

* * * * *